United States Patent
Sugimoto

(10) Patent No.: US 9,019,433 B2
(45) Date of Patent: Apr. 28, 2015

(54) IMAGE PROCESSING APPARATUS AND METHOD

(75) Inventor: Kousei Sugimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1968 days.

(21) Appl. No.: 11/839,678

(22) Filed: Aug. 16, 2007

(65) Prior Publication Data

US 2008/0055482 A1 Mar. 6, 2008

(30) Foreign Application Priority Data

Aug. 31, 2006 (JP) .................................. 2006-236755

(51) Int. Cl.
*H04N 5/14* (2006.01)
*H04N 5/202* (2006.01)
*G09G 5/10* (2006.01)

(52) U.S. Cl.
CPC ................. *H04N 5/202* (2013.01); *G09G 5/10* (2013.01); *G09G 2320/0271* (2013.01); *G09G 2320/066* (2013.01); *G09G 2320/103* (2013.01); *G09G 2360/16* (2013.01); *H04N 5/147* (2013.01)

(58) Field of Classification Search
CPC ................. G09G 2320/0271; G09G 2320/066; G09G 2320/103; G09G 2360/16; G09G 5/10; H04N 5/147; H04N 5/202
USPC .......................................................... 348/700
See application file for complete search history.

(56) References Cited

U.S. PATENT DOCUMENTS

| | | | |
|---|---|---|---|
| 6,747,694 B1 | 6/2004 | Nishikawa et al. | |
| 7,034,896 B2 * | 4/2006 | Ito et al. .......................... | 348/675 |
| 7,548,357 B2 | 6/2009 | Moriya | |
| 7,667,721 B2 | 2/2010 | Minami et al. | |
| 7,705,919 B2 * | 4/2010 | Suzuki et al. .................. | 348/672 |
| 7,839,455 B2 * | 11/2010 | Harada .......................... | 348/672 |
| 2002/0006230 A1 * | 1/2002 | Enomoto ....................... | 382/261 |
| 2002/0047936 A1 * | 4/2002 | Tojo ................................ | 348/700 |
| 2005/0031201 A1 * | 2/2005 | Goh ................................ | 382/169 |
| 2005/0169524 A1 * | 8/2005 | Moriya .......................... | 382/167 |
| 2006/0268180 A1 * | 11/2006 | Chou ............................. | 348/673 |

FOREIGN PATENT DOCUMENTS

| | | | |
|---|---|---|---|
| JP | 07-322096 | 12/1995 | |
| JP | 09-009142 | 1/1997 | |
| JP | 2001-094871 | 4/2001 | |
| JP | 2003-047004 A | 2/2003 | |
| JP | 2004-007238 A | 1/2004 | |
| JP | 2004-032207 A | 1/2004 | |
| JP | 2005-204136 A | 7/2005 | |
| JP | 2005-318198 | 11/2005 | |
| JP | 2005-318798 | 11/2005 | |
| JP | 2005318198 A | * 11/2005 | ............... H04N 5/20 |
| JP | 2006-197460 | 7/2006 | |

\* cited by examiner

*Primary Examiner* — Mehrdad Dastouri
*Assistant Examiner* — Mohammed Rahaman
(74) *Attorney, Agent, or Firm* — Cowan, Liebowitz & Latman, P.C.

(57) ABSTRACT

Gradation transform considering a scene transitional direction is executed for a video signal. The statistic of the luminance distribution of the input video signal is detected. The transitional direction of brightness of a scene of the input video signal is detected. A transform characteristic in transforming the gradation characteristic of the input video signal is set based on the detection results of the statistic and transitional direction.

12 Claims, 19 Drawing Sheets

F I G. 10
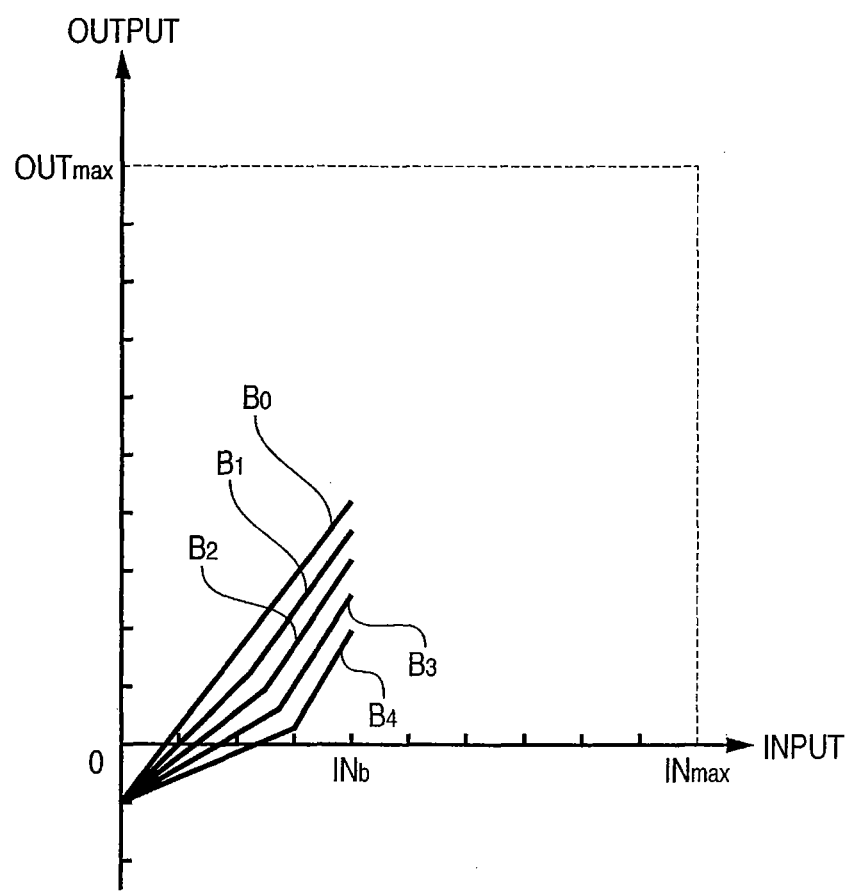

F I G. 11
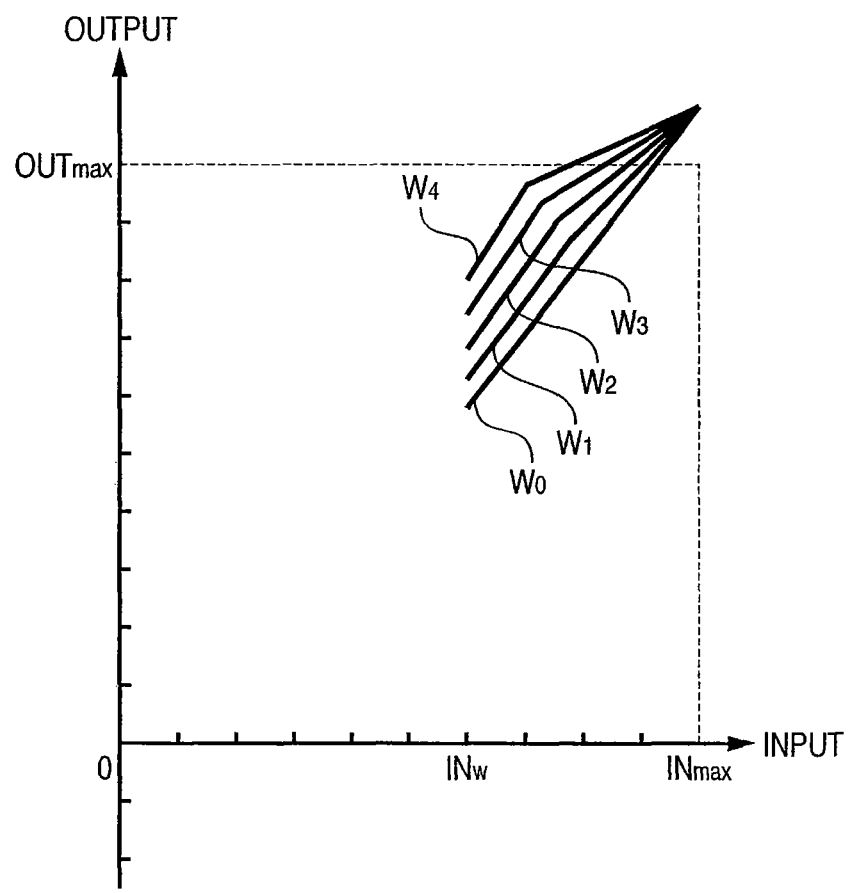

IMAGE PROCESSING APPARATUS AND METHOD

BACKGROUND OF THE INVENTION

1. Field of the Invention

The present invention relates to image processing for outputting a video signal (image data) obtained by processing an input video signal (input image data) and, more particularly, to image processing for transforming the gradation characteristic of a video signal on the basis of the transitional direction of the brightness of a video scene.

2. Description of the Related Art

A video display apparatus such as a television executes signal processing of executing gradation transform of a video signal. In this signal processing, predetermined gradation transform of a video signal is executed in consideration of the characteristic of the display and the contrast and gradation level of video data itself. For example, a process called black stretch allocates a lot of black gradation steps to a video signal, thereby improving black expression. A liquid crystal TV executes inverse transform (inverse gamma conversion) to cancel gradation transform which a broadcaster has executed for a video signal and make the video signal have a linear gradation characteristic and then displays a video image.

In general, gradation transform is often executed by using a lookup table (LUT). The data of an LUT contains the sets of inputs and outputs corresponding to them. Upon receiving data, the LUT outputs data corresponding to the input data. An LUT used in, for example, a video display apparatus often has an input-output characteristic that draws a curve. This curve is generally called a gamma conversion curve or a gamma curve.

A technique called a dynamic gamma process has recently been invented, which executes optimum gradation transform for each scene (single frame or a plurality of frames) of video data. In this process, input data is corrected to visually optimize the image of each scene in accordance with the pixel value distribution of each scene or the degree of change between scenes.

However, the dynamic gamma process executes gradation transform without considering the adaptability of eyes. For this reason, the video contrast sometimes visually lowers when the scene changes. For example, when bright scenes continue, the eyes adapt to the bright image region, and their sensitivity to a dark image region becomes low. If a dark scene follows consecutive bright scenes, the user cannot see the dark scene well.

SUMMARY OF THE INVENTION

In one aspect, an image processing method comprising the steps of detecting a statistic of a luminance distribution of an input video signal, detecting a transitional direction of brightness of a scene of the input video signal, transforming a gradation characteristic of the input video signal, and setting a transform characteristic in the transforming step based on detection results in the statistic detecting step and the transitional direction detecting step.

According to the aspect, gradation transform of a video signal can be executed in consideration of the scene transitional direction. Hence, even when a scene changes, it is possible to generate a video signal with a visually high contrast to form a desirable image complying with the adaptability of human eyes.

Further features of the present invention will become apparent from the following description of exemplary embodiments with reference to the attached drawings.

BRIEF DESCRIPTION OF THE DRAWINGS

FIGS. 10 and 11 are graphs showing examples of transform characteristic data held by the transform characteristic setting unit;

DESCRIPTION OF THE EMBODIMENTS

An image processing apparatus for executing signal processing according to an embodiment of the present invention will be described below in detail with reference to the accompanying drawings.

First Embodiment

[Arrangement of Signal Processing Apparatus]

Figure 1:
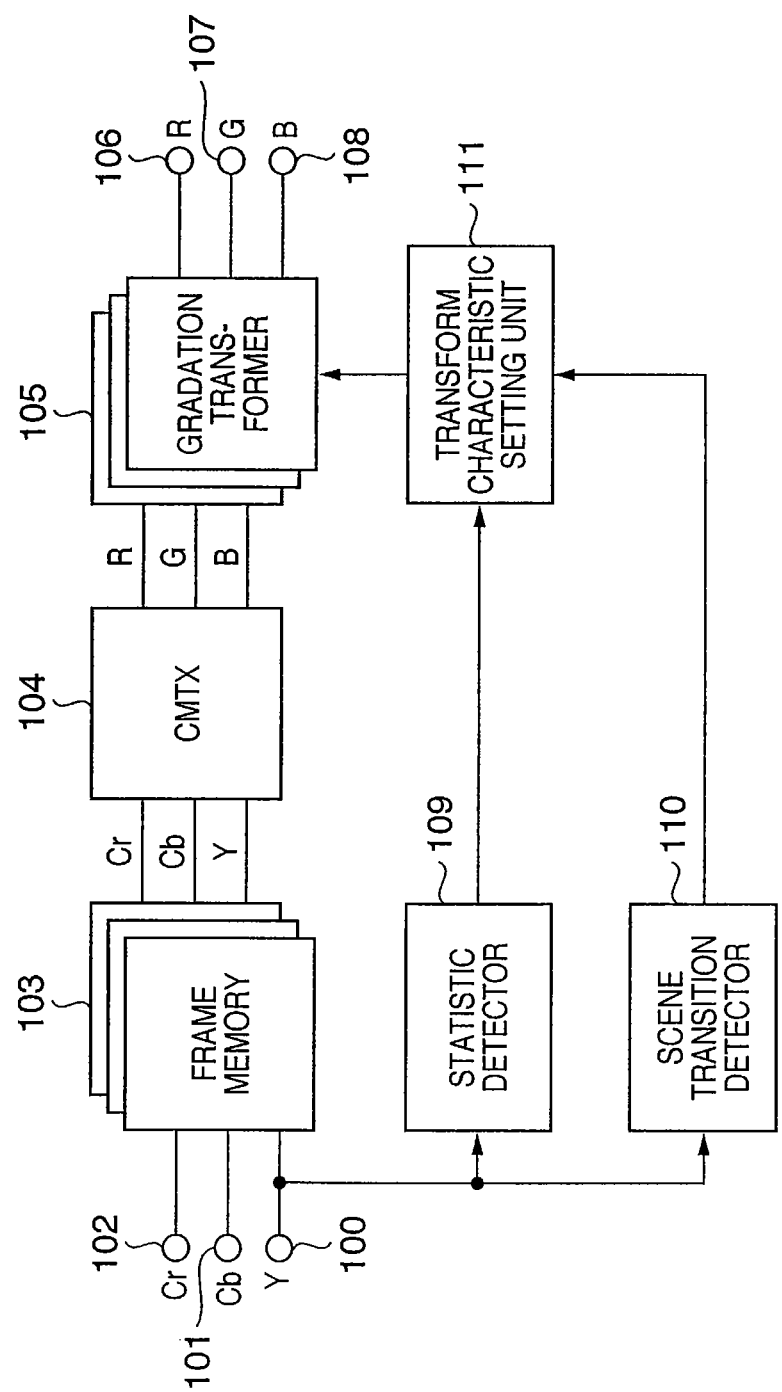
FIG. 1 is a block diagram showing the arrangement of an image processing apparatus according to the first embodiment.

FIG. 1 is a block diagram showing the arrangement of an image processing apparatus which receives Y, Cb, and Cr video signals, converts them into R, G, and B video signals, and outputs the R, G, and B video signals that have undergone gradation transform.

Y, Cb, and Cr video signals input to input terminals 100 to 102 are delayed by frame memories 103 corresponding to the respective signal components to synchronize the video signal input timing with the transform characteristic setting timings in gradation transformers 105. A color matrix (CMTX) 104 converts the Y, Cb, and Cr video signals delayed by the frame memories 103 into R, G, and B video signals and inputs them to the gradation transformers 105. The R, G, and B video signals are subjected to gradation transform by the gradation transformers 105 and output from output terminals 106 to 108.

Figure 2:
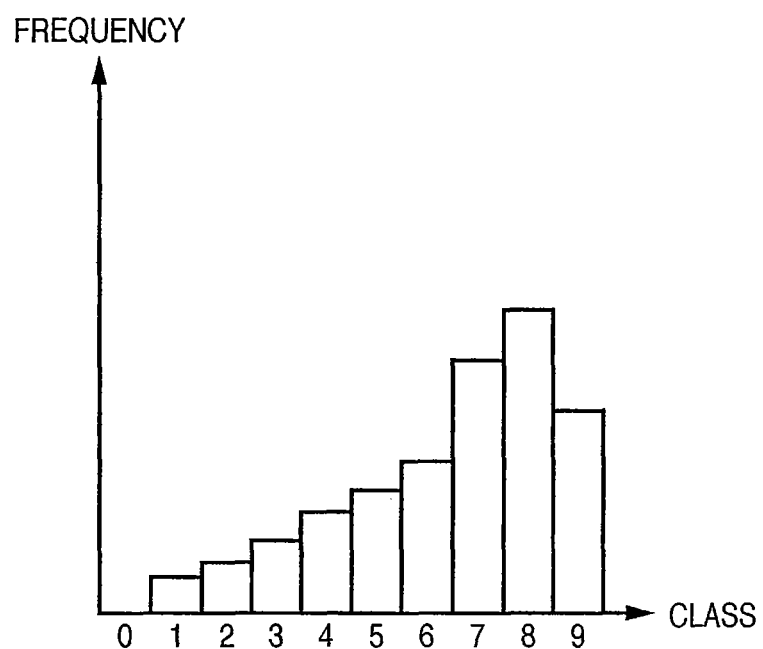
FIG. 2 is a graph showing an example of the luminance distribution histogram of a bright frame.
Figure 3:
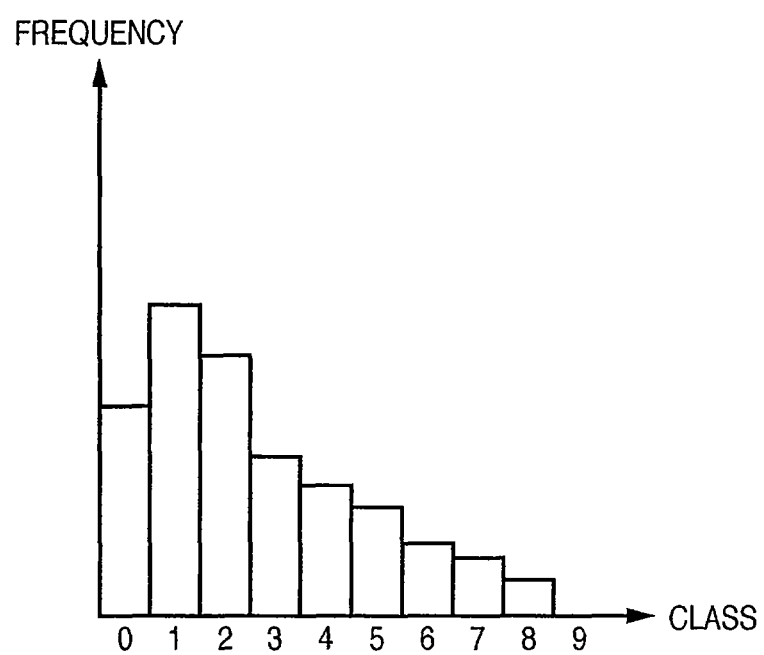
FIG. 3 is a graph showing an example of the luminance distribution histogram of a dark frame.

A statistic detector 109 measures the luminance distribution histogram of each frame of the input Y, Cb, and Cr video signals. The statistic detector 109 divides the possible range of the Y data (luminance) of the video signals into 10 classes (0 to 9). The statistic detector 109 checks the class of Y data of each pixel and counts the number of pixels belonging to each class as the frequency of the class, thereby acquiring the luminance distribution histogram of each frame. FIG. 2 is a graph showing an example of the luminance distribution histogram of a bright frame. A class corresponding to a high luminance level has a high frequency. FIG. 3 is a graph showing an example of the luminance distribution histogram of a dark frame. A class corresponding to a low luminance level has a high frequency.

A scene transition detector 110 measures the average luminance level (APL) of each frame of the input Y, Cb, and Cr video signals. The scene transition detector 110 generates scene change information, scene transitional direction information, and scene length information of each frame.

Scene change information indicates whether the scene has changed. More specifically, the scene transition detector 110 compares the APL of the preceding frame and that of the current frame. If the difference is equal to or larger than a predetermined value sch, the scene transition detector 110 generates scene change information indicating the presence of scene change. If the difference is smaller than the predetermined value sch, the scene transition detector 110 generates scene change information indicating the absence of scene change.

Scene transitional direction information indicates whether the current scene is brighter or darker than the preceding scene. More specifically, the scene transition detector 110 subtracts the APL of the preceding frame from that of the current frame. If the difference is equal to or more than a predetermined value str1 (>0), scene transitional direction information indicating transition from a dark scene to a bright scene is generated. If the difference is equal to or less than a predetermined value str2 (<0), scene transitional direction information indicating transition from a bright scene to a dark scene is generated. If the difference is less than str1 and more than str2, scene transitional direction information indicating the absence of transition is generated.

Scene length information indicates the length of a scene. More specifically, the scene transition detector 110 generates scene length information representing the count value of frames between scene changes.

A transform characteristic setting unit 111 decides a transform characteristic to be applied to a frame based on the luminance distribution histogram received from the statistic detector 109 and the scene change information, scene transitional direction information, and scene length information received from the scene transition detector 110. The decided transform characteristic is set in the gradation transformers 105.

The gradation transformers 105 execute gradation transform corresponding to the set transform characteristic for the respective signal components of the R, G, and B video signals and output the R, G, and B video signals that have undergone the gradation transform from the terminals 106 to 108.

[Transform Characteristic Setting Unit]
Transform Characteristic Data

Figure 5:
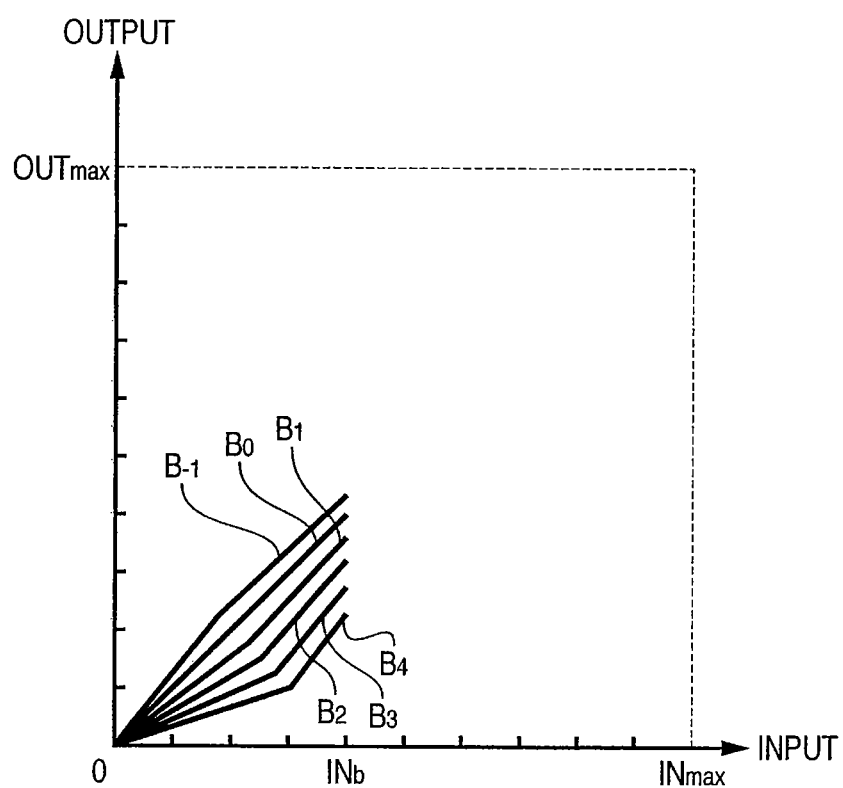
FIGS. 5 and 6 are graphs showing examples of transform characteristic data held by the transform characteristic setting unit.
Figure 6:
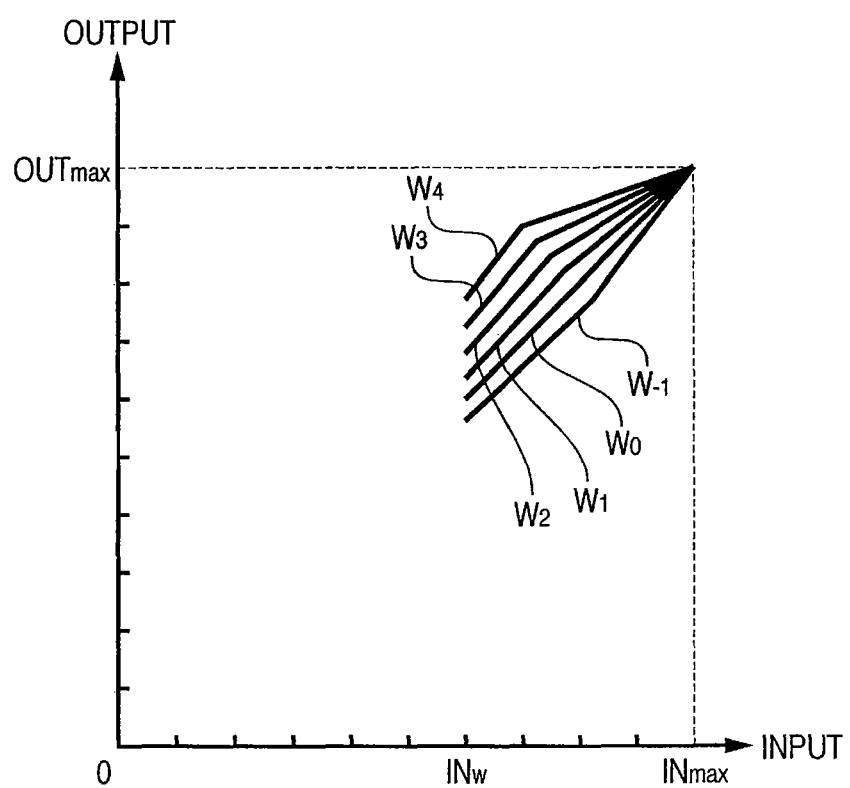

FIGS. 5 and 6 are graphs showing examples of transform characteristic data held in a read-only memory (ROM) 404 (to be described later) by the transform characteristic setting unit. FIG. 5 shows transform characteristic data corresponding to inputs 0 to INb. FIG. 6 shows transform characteristic data corresponding to inputs INw to INmax. Note that INmax is the maximum input value, and INmax>INw>INb>0 holds. The means for holding transform characteristic data is not limited to the ROM. Any other nonvolatile memory such as an electrically erasable programmable ROM (EEPROM) can update transform characteristic data as needed.

As shown in FIG. 5, there are six transform characteristics $B_{-1}$ to $B_4$ corresponding to the inputs 0 to INb. As shown in FIG. 6, there are six transform characteristics $W_{-1}$ to $W_4$ corresponding to the inputs INw to INmax. $B_{-1}$ to $B_4$ are called a group of black side curves, and their identification numbers are called black side curve numbers. Similarly, $W_{-1}$ to $W_4$ are called a group of white side curves, and their identification numbers are called white side curve numbers.

In the group of black side curves, as the number becomes smaller, the number of gradation steps allocated to the low luminance side (0 to INb) increases. In the group of white side curves, as the number becomes smaller, the number of gradation steps allocated to the high luminance side (INw to INmax) increases. One black side curve and one white side curve are selected, and the data between INb and INw is linearly interpolated, thereby generating one curve, that is, a transform characteristic. This will be described later in detail.

Curve Number Selector

Figure 4:
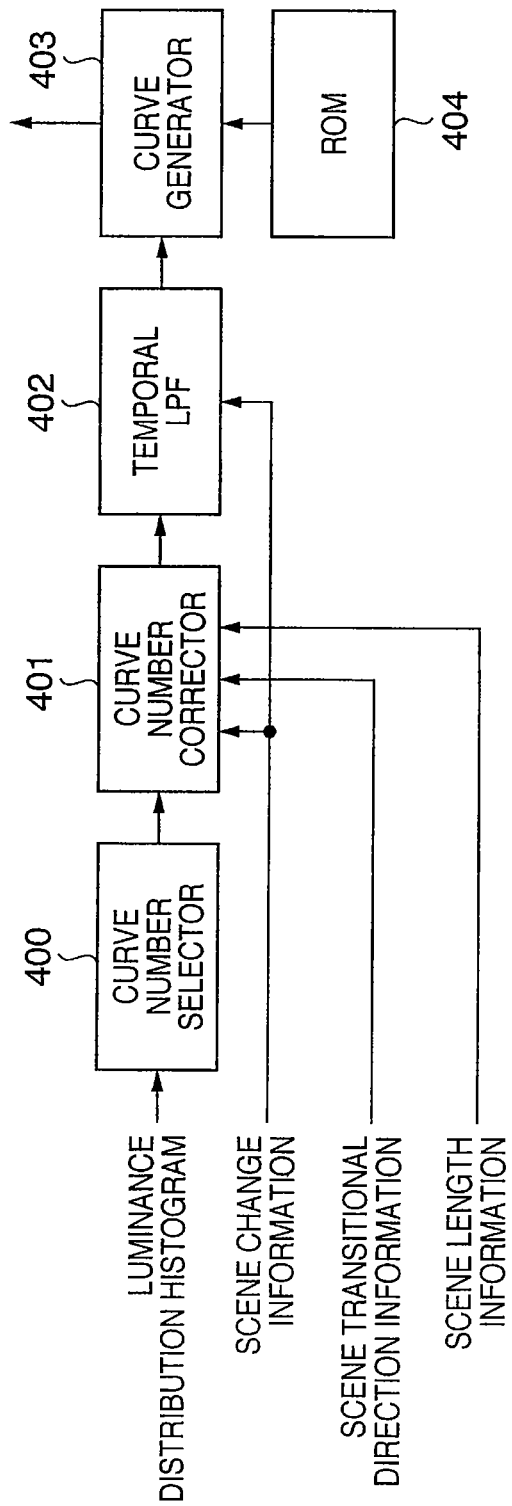
FIG. 4 is a block diagram showing the arrangement of a transform characteristic setting unit.

FIG. 4 is a block diagram showing the arrangement of the transform characteristic setting unit 111.

A curve number selector 400 selects a black side curve number and a white side curve number from the luminance distribution histogram of each frame received from the statistic detector 109.

The black side curve number is selected in the following way. The class is raised sequentially from class 0 corresponding to the lowest luminance level. The frequencies are sequentially added from class 0 to class 3. The black side curve number is decided depending on the class whose added frequency makes the sum exceed a predetermined value thb. More specifically, let L0, L1, L2, and L3 be the frequencies of classes 0 to 3. The black side curve number is selected in the following way.

If thb≤L0, $B_0$ is selected.
If L0<thb≤L0+L1, $B_1$ is selected.
If L0+L1<thb≤L0+L1+L2, $B_2$ is selected.
If L0+L1+L2<thb≤L0+L1+L2+L3, $B_3$ is selected.
If L0+L1+L2+L3≤thb, $B_4$ is selected.

The white side curve number is selected in the following way. The class is lowered sequentially from class 9 corresponding to the highest luminance level. The frequencies are sequentially added from class 9 to class 6. The white side curve number is decided depending on the class whose added frequency makes the sum exceed a predetermined value thw. More specifically, let L9, L8, L7, and L6 be the frequencies of classes 9 to 6. The white side curve number is selected in the following way.

If thw≥L9, $W_0$ is selected.
If L9<thw≤L9+L8, $W_1$ is selected.
If L9+L8<thw≤L9+L8+L7, $W_2$ is selected.
If L9+L8+L7<thw≤L9+L8+L7+L6, $W_3$ is selected.
If L9+L8+L7+L6<thw, $W_4$ is selected.

As described above, the curve number selector 400 selects a black side curve which allocates many gradation steps to the low luminance side when the frequency of a low class is high and a white side curve which allocates many gradation steps to the high luminance side when the frequency of a high class is high.

Curve Number Corrector

A curve number corrector 401 corrects the black side curve number and white side curve number, which are selected by the curve number selector 400, based on the scene change information, scene transitional direction information, and scene length information received from the scene transition detector 110. Curve number correction (i.e., transform characteristic correction) based on the scene change information, scene transitional direction information, and scene length information is sometimes called "scene correction".

Figure 7:
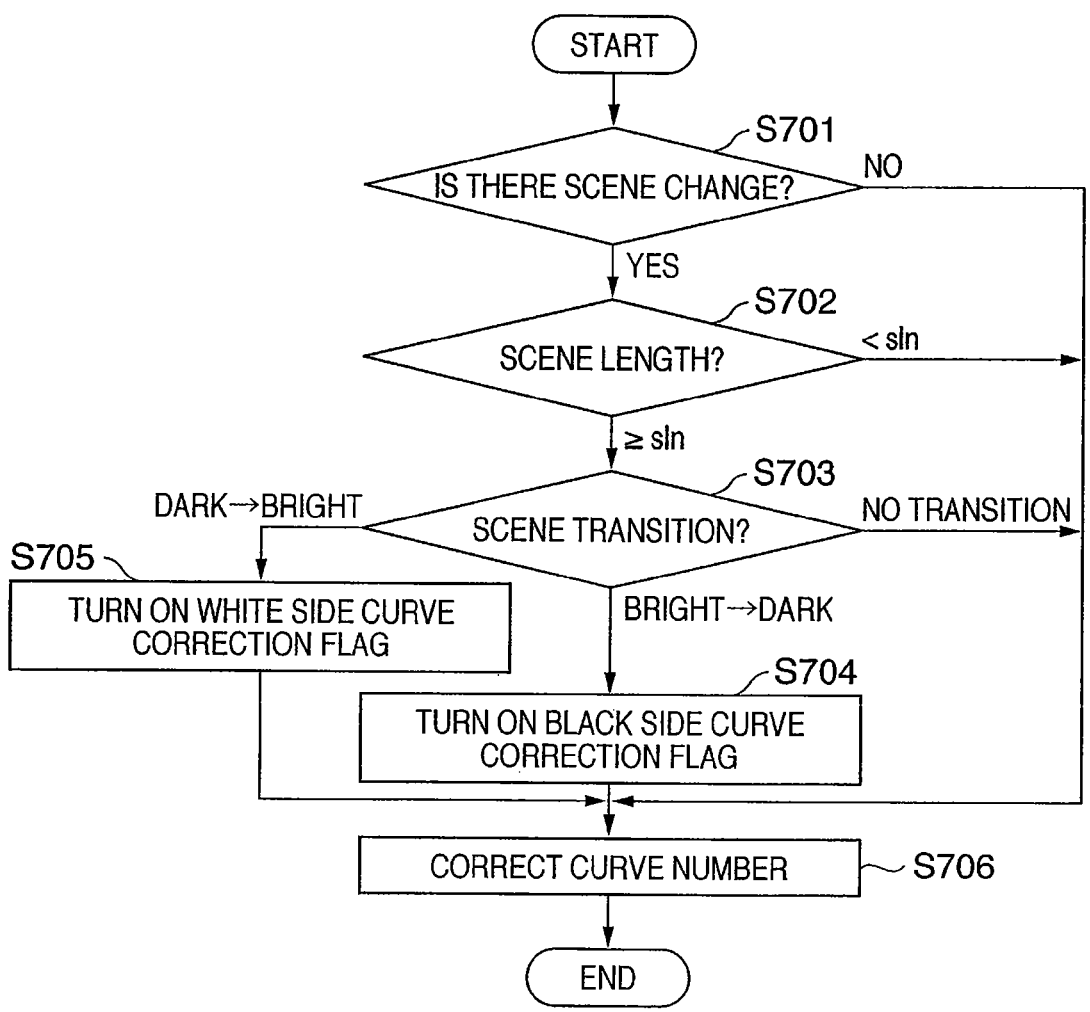
FIG. 7 is a flowchart for explaining the operation of a curve number corrector.

FIG. 7 is a flowchart for explaining the operation of the curve number corrector 401.

First, the curve number corrector 401 determines the presence/absence of a scene change based on the scene change information (S701). If no scene change exists, the process advances to step S706.

If a scene change exists, the curve number corrector 401 determines based on the scene length information whether the length of the scene before the scene change is equal to or larger than a predetermined value sln (S702). If the length of the preceding scene is smaller than sin, the process advances to step S706.

If the length of the preceding scene is equal to or larger than sin, the curve number corrector 401 determines the scene transitional direction based on the scene transitional direction information (S703). If no transition exists, the process advances to step S706. If transition from a bright scene to a dark scene occurs, the curve number corrector 401 turns on a black side curve correction flag (S704). If transition from a dark scene to a bright scene occurs, the curve number corrector 401 turns on a white side curve correction flag (S705).

When the black side curve correction flag is ON, the curve number corrector 401 decrements the black side curve number by one and selects a black side curve number which allocates many gradation steps to a lower luminance side. When the white side curve correction flag is ON, the curve number corrector 401 decrements the white side curve number by one and selects a white side curve number which allocates many gradation steps to a higher luminance side. If both correction flags are OFF, the curve number corrector 401 does not execute curve number correction (S706).

The curve number corrector 401 holds the states of the black and white side curve correction flags without resetting them to OFF in each process. In other words, the curve number corrector 401 holds the curve number correction states. When the scene has changed, or a predetermined time has elapsed after the correction flag is turned on, the curve number corrector 401 resets the correction flags before the start of the process shown in FIG. 7. That is, the curve number correction is reset.

Temporal LPF

A temporal low-pass filter (LPF) 402 averages the black side curve number and white side curve number of each frame within a predetermined period, thereby suppressing screen flicker which takes place when the curve numbers vigorously vary. When the curve numbers are averaged, their trackability to the video image degrades. For this reason, when a scene change exists, curve number averaging is reset. This makes it possible to instantaneously apply the curve number decided from the current frame without any influence of the curve number of the preceding frame if a scene change exists.

The temporal LPF 402 holds k black side curve numbers and k white side curve numbers supplied from the curve number corrector 401 in correspondence with each frame. Let n be the current frame, $coeB_n$ be the black side curve number of the current frame, $coeB_{n-1}$ be the black side curve number of the immediately preceding frame, ..., and $coeB_{n-k+1}$ be the black side curve number of the (k−1)th preceding frame. In this case, an averaged black side curve number coeB is given by $$coeB = (coeB_n + coeB_{n-1} \ldots + coeB_{n-k+1})/k \quad (1)$$

Similarly, let $coeW_n$ be the white side curve number of the current frame, $coeW_{n-1}$ be the white side curve number of the immediately preceding frame, ..., and $coeW_{n-k+1}$ be the white side curve number of the (k−1)th preceding frame. In this case, an averaged white side curve number coeW is given by $$coeW = (coeW_n + coeW_{n-1} \ldots + coeW_{n-k+1})/k \quad (2)$$

When a scene change exists, the temporal LPF 402 replaces all the held black side curve numbers $coeB_{n-1}$ to $coeB_{n-k+1}$ with $coeB_n$ and averages them. The temporal LPF 402 also replaces all the held white side curve numbers $coeW_{n-1}$ to $coeW_{n-k+1}$ with $coeW_n$ and averages them. Hence, when a scene change exists, the averaged curve numbers are reset to $coeB = coeB_n$ and $coeW = coeW_n$ so that the curve numbers $coeB_n$ and $coeW_n$ of the current frame can instantaneously be applied.

Curve Generator

A curve generator 403 acquires, from the ROM 404, transform characteristic data corresponding to the black side curve number coeB and white side curve number coeW received from the temporal LPF 402 and linearly interpolates the data between INb and INw, thereby generating one curve, that is, a transform characteristic. The generated transform characteristic is set in the gradation transformers 105.

Figure 8:
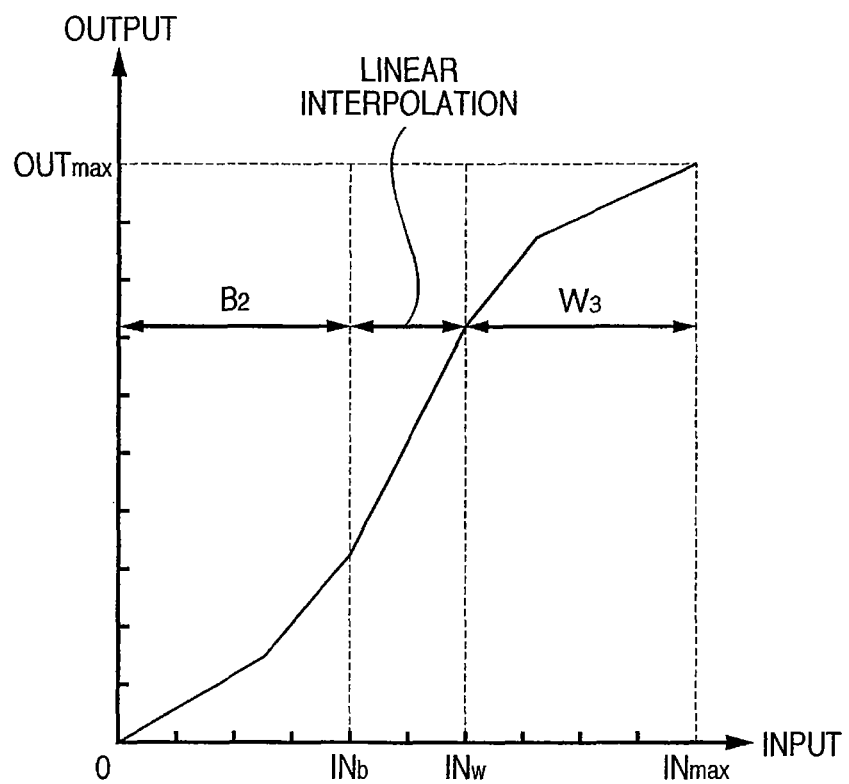
FIG. 8 is a graph showing an example of a transform characteristic generated by a curve generator.

A detailed example will be explained. When the black side curve number coeB supplied from the temporal LPF 402 is $B_2$, and the white side curve number coeW is $W_3$, the curve generator 403 acquires the transform characteristic data $B_2$ and $W_3$ from the ROM 404. The acquired transform characteristic data lacks transform characteristic data between INb and INw. Hence, the curve generator 403 generates transform characteristic data that connects the white side curve to the black side curve by, for example, a line segment. FIG. 8 is a graph showing an example of a transform characteristic generated by the curve generator 403.

In the above-described manner, the transform characteristic setting unit 111 generates (determines) a transform characteristic corresponding to each frame and sets the generated (determined) transform characteristic in the gradation transformers 105.

As described above, the image processing apparatus according to the first embodiment can generate a video signal with a visually high contrast even when the scene changes by executing scene correction for a transform characteristic decided from the luminance distribution histogram of one frame.

In addition to the transform characteristic data directly decided from the luminance distribution histogram of one frame, the transform characteristic data $B_{-1}$ and $W_{-1}$ are prepared. Hence, even when scene correction is done by decrementing the curve number by one, an appropriate transform characteristic curve can be decided.

The transform characteristic on the low luminance side and that on the high luminance side are individually decided. This makes it possible to appropriately correct only desired gradational portions on the high and low luminance sides while preventing the transform characteristic on the low luminance side from adversely affecting that on the high luminance side, and vice versa.

If the length of the preceding scene is smaller than the predetermined value sin, the transform characteristic is not corrected. This prevents the user from feeling a sense of incongruity which occurs upon transform characteristic correction without sufficient eye adaptation to the brightness of the preceding scene.

If the difference between the APL of the preceding frame and that of the current frame is equal to or larger than the predetermined value str1 (>0) or equal to or less than the predetermined value str2 (<0), the transform characteristic is corrected. This prevents the user from feeling a sense of incongruity which occurs upon transform characteristic correction based on a slight brightness difference between scenes.

Transform characteristic correction is reset after the elapse of a predetermined time from the start of correction (correction flag ON). This makes it possible to, for example, finish transform characteristic correction when the eyes are adapted to the current scene. Transform characteristic correction is also reset when a scene change exists. That is, transform characteristic correction starts at the timing of a scene change. This allows execution of gradation transform complying with the adaptability of human eyes without making the user feel a sense of incongruity of sudden change in gradation.

Second Embodiment

Signal processing according to the second embodiment of the present invention will be described below. The same reference numerals as in the first embodiment denote the same parts in the second embodiment, and a detailed description thereof will be omitted.

In the first embodiment, a transform characteristic is corrected by correcting the curve number of the transform characteristic. In the second embodiment, an example will be described in which a transform characteristic is directly corrected. In the first embodiment, a method of coping with the adaptability of eyes by allocating many gradation steps to the low luminance side or high luminance side has been described. In the second embodiment, a method of coping with the adaptability of eyes by shifting a transform characteristic in a direction of eye adaptation range will be described.

Figure 9:
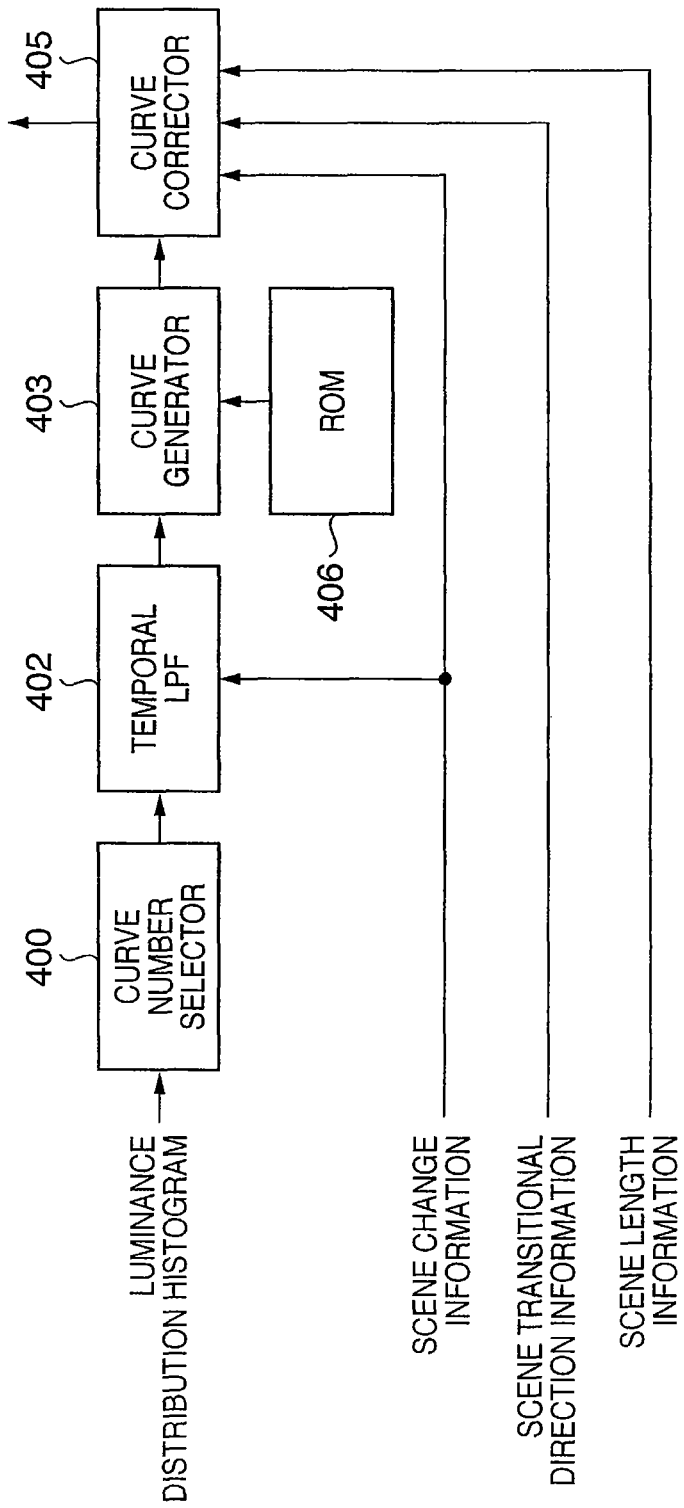
FIG. 9 is a block diagram showing the arrangement of a transform characteristic setting unit according to the second embodiment.

FIG. 9 is a block diagram showing the arrangement of a transform characteristic setting unit 111 according to the second embodiment.

Referring to FIG. 9, a curve number selector 400, temporal LPF 402, and curve generator 403 execute the same operations as in the first embodiment, and a detailed description thereof will be omitted. Scene change information, scene transitional direction information, and scene length information are also the same as in the first embodiment.

Transform Characteristic Data

FIGS. 10 and 11 are graphs showing examples of transform characteristic data held in a ROM 406 by the transform characteristic setting unit 111.

The ROM 406 holds the transform characteristic data of a group of black side curves and a group of white side curves as transform characteristic generation sources. The ROM 404 of the first embodiment holds transform characteristic data such as $B_{-1}$ and $W_{-1}$ which are not directly selected by the curve number selector 400. To the contrary, the ROM 406 of the second embodiment need not hold characteristic data which are not directly selected by the curve number selector 400.

The transform characteristic data held in the ROM 406 have a characteristic for transforming an input value to 0 or less, as shown in FIG. 10, and a characteristic for transforming an input value to a value more than a maximum output value OUTmax of gradation transformers 105, as shown in FIG. 11. The characteristic for transforming an input value to data outside the output range (0 to OUTmax) of the gradation transformers 105 is used for transform characteristic correction by a curve corrector 405.

Curve Corrector

Figure 12:
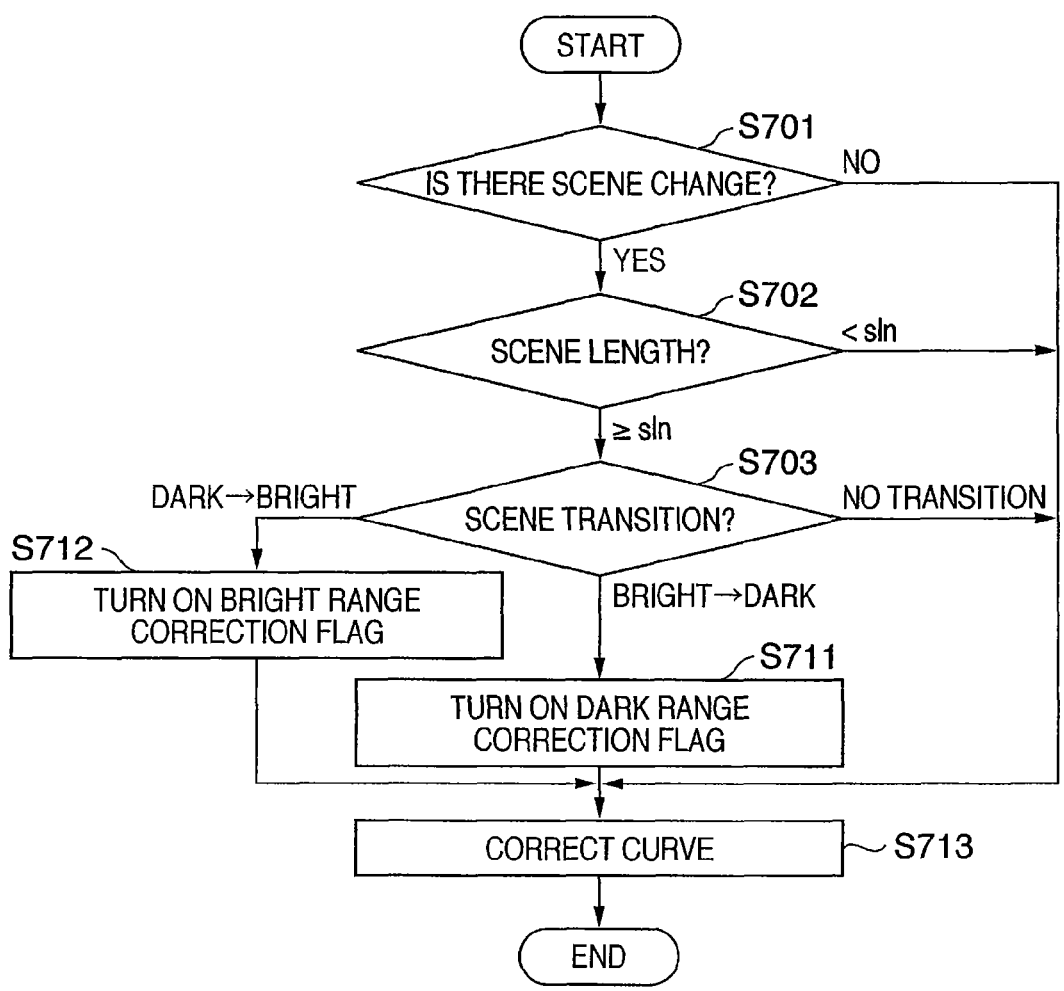
FIG. 12 is a flowchart for explaining scene correction by a curve corrector.

FIG. 12 is a flowchart for explaining scene correction by the curve corrector 405. The processes in steps S701 to S703 are the same as in the first embodiment (FIG. 7), and a detailed description thereof will be omitted.

If the scene transitional direction information indicates the absence of transition, the curve corrector 405 advances the process to step S713. If the scene transitional direction information indicates transition from a bright scene to a dark scene, a dark range correction flag is turned on (S711). If the information indicates transition from a dark scene to a bright scene, a bright range correction flag is turned on (S712).

When the dark range correction flag is ON, the curve corrector 405 adds a predetermined value OFFSETb to output values corresponding to the respective input values of the transform characteristic generated by the curve generator 403 (dark range correction). When the bright range correction flag is ON, the curve corrector 405 subtracts a predetermined value OFFSETw from output values corresponding to the respective input values of the transform characteristic generated by the curve generator 403 (bright range correction). The transform characteristic in a region where the output value corresponding to an input value is smaller than 0 is clipped at 0. The transform characteristic in a region where the output value is larger than OUTmax is clipped at OUTmax. If both correction flags are OFF, the curve corrector 405 does not execute curve correction (S713).

Figure 13:
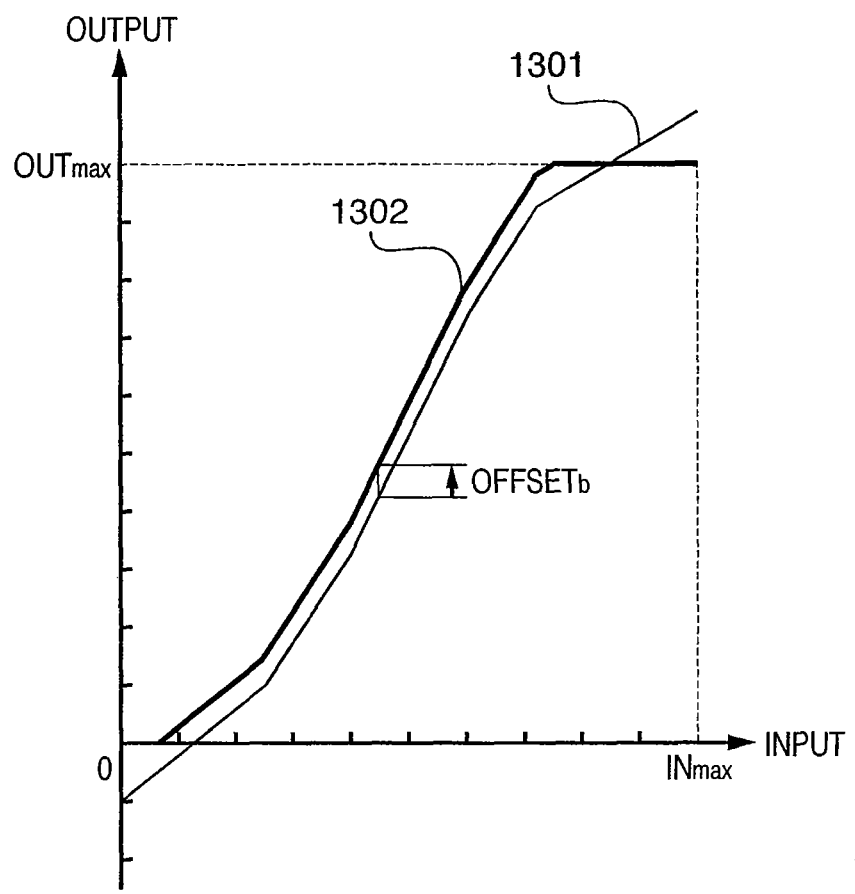
FIG. 13 is a graph showing an example of dark range correction.

FIG. 13 is a graph showing an example of dark range correction. A curve 1301 indicates a transform characteristic generated by the curve generator 403 from a black side curve number $B_2$ and a white side curve number $W_3$. A curve 1302 indicates a transform characteristic obtained by adding OFFSETb in dark range correction and clipping the characteristic at 0 and OUTmax.

Figure 14:
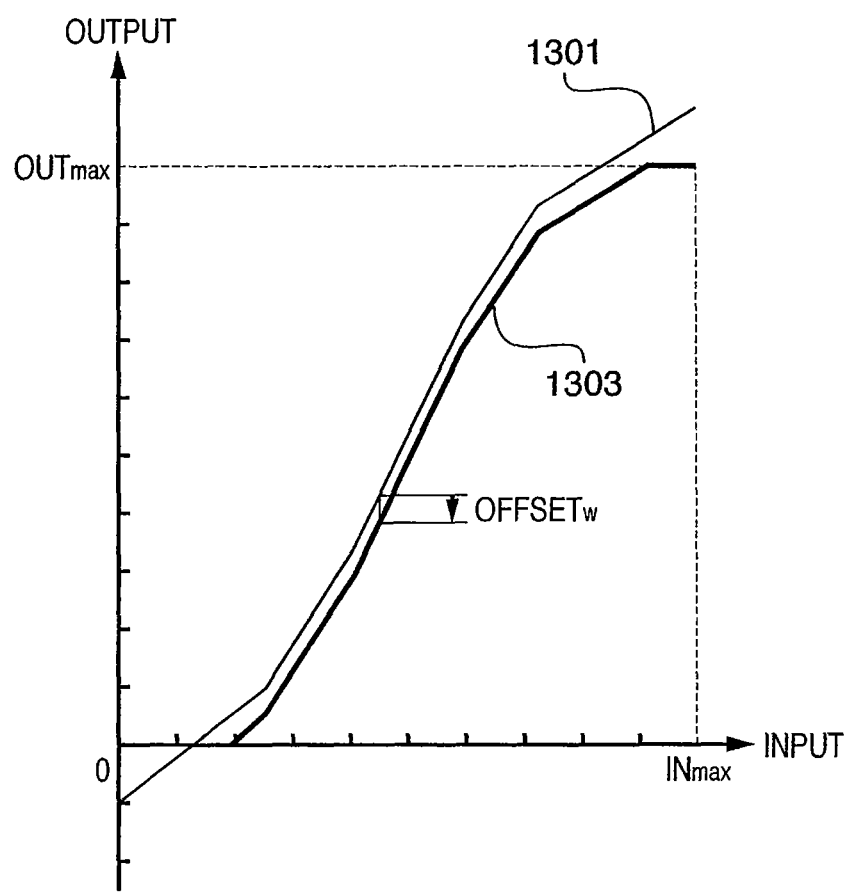
FIG. 14 is a graph showing an example of bright range correction.

FIG. 14 is a graph showing an example of bright range correction. The curve 1301 indicates a transform characteristic generated by the curve generator 403 from the black side curve number $B_2$ and the white side curve number $W_3$. A curve 1303 indicates a transform characteristic obtained by subtracting OFFSETw in bright range correction and clipping the characteristic at 0 and OUTmax.

The curve corrector 405 holds the states of the black and bright range correction flags without resetting them to OFF in each process, as in the first embodiment. In other words, the curve corrector 405 holds the curve correction states. When the scene has changed, or a predetermined time has elapsed after the correction flag is turned on, the curve corrector 405 resets the correction flags before the start of the process shown in FIG. 12. That is, the curve correction is reset.

Figure 15:
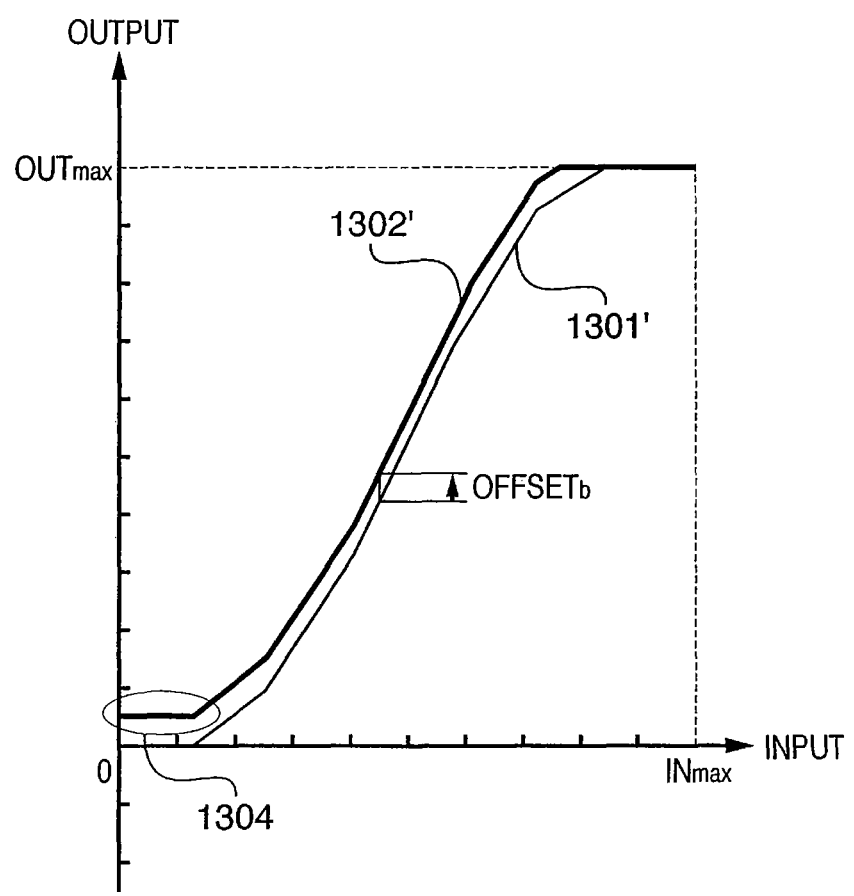
FIGS. 15 and 16 are graphs for explaining the reason why the transform characteristic held by the transform characteristic setting unit has a characteristic for transforming to data outside the output range of a gradation transformer.
Figure 16:
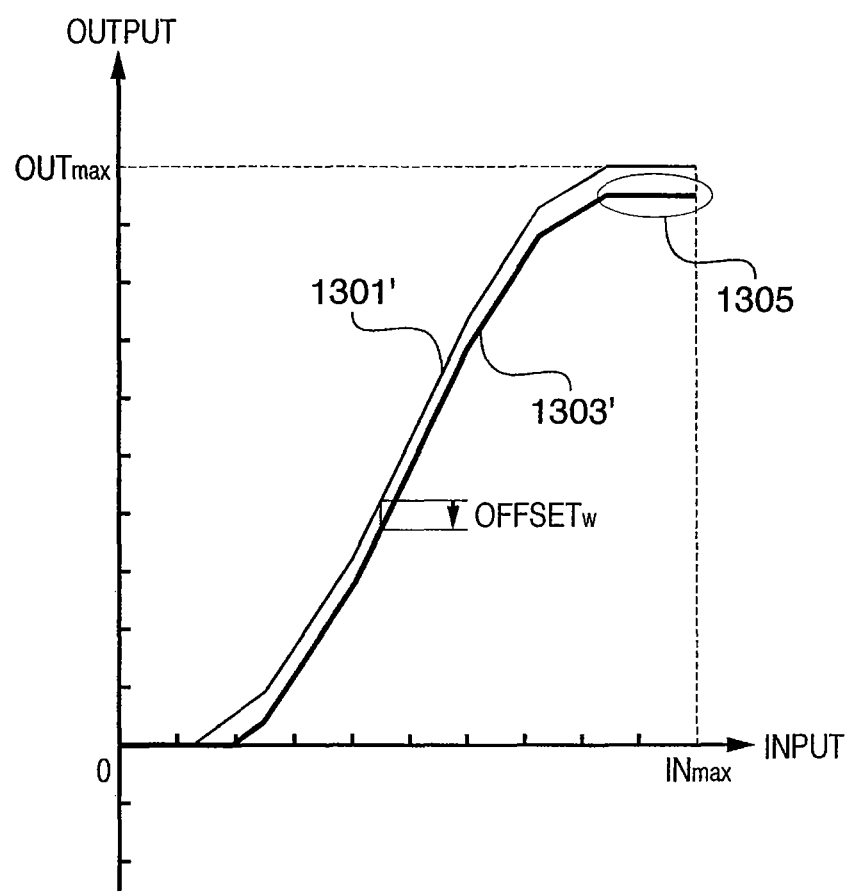

FIGS. 15 and 16 are graphs for explaining the reason why the transform characteristic held in the ROM 406 by the transform characteristic setting unit 111 has the characteristic for transforming to data outside the output range (0 to OUTmax) of the gradation transformers 105. As shown in FIGS. 15 and 16, if the transform characteristic generated by the curve generator 403 is represented by a curve 1301' having no characteristic for transforming to data outside the output range, the curve correction results are indicated by curves 1302' and 1303'. As a result, the transform characteristic is clipped halfway in the low luminance portion and high luminance portion, as indicated by 1304 and 1305, and the output range of the gradation transformers 105 cannot effectively be used.

When the transform characteristic held in the ROM 406 has the characteristic for transforming to data outside the output range of the gradation transformers 105, it is impossible to fully use the output range of the gradation transformers 105, as shown in FIGS. 13 and 14.

As described above, the image processing apparatus according to the second embodiment can generate a video signal with a visually high contrast even when the scene changes by executing scene correction for a transform characteristic decided from the luminance distribution histogram of one frame, as in the first embodiment. Additionally, since the transform characteristic is directly corrected, scene correction can be done without preparing transform characteristic data except that decided from the luminance distribution histogram of one frame, unlike the first embodiment. Furthermore, since the transform characteristic data has the characteristic for transforming to data outside the output range of the gradation transformers 105, the transform characteristic after scene correction can fully use the output range of the gradation transformers 105.

Third Embodiment

Signal processing according to the third embodiment of the present invention will be described below. The same reference numerals as in the first and second embodiments denote the same parts in the third embodiment, and a detailed description thereof will be omitted.

In the second embodiment, scene correction is executed by adding/subtracting an offset to/from a transform characteristic. In the third embodiment, a method of implementing gradation transform complying with the adaptability of eyes by adding/subtracting an offset to/from a video signal after gradation transform will be described.

Figure 17:
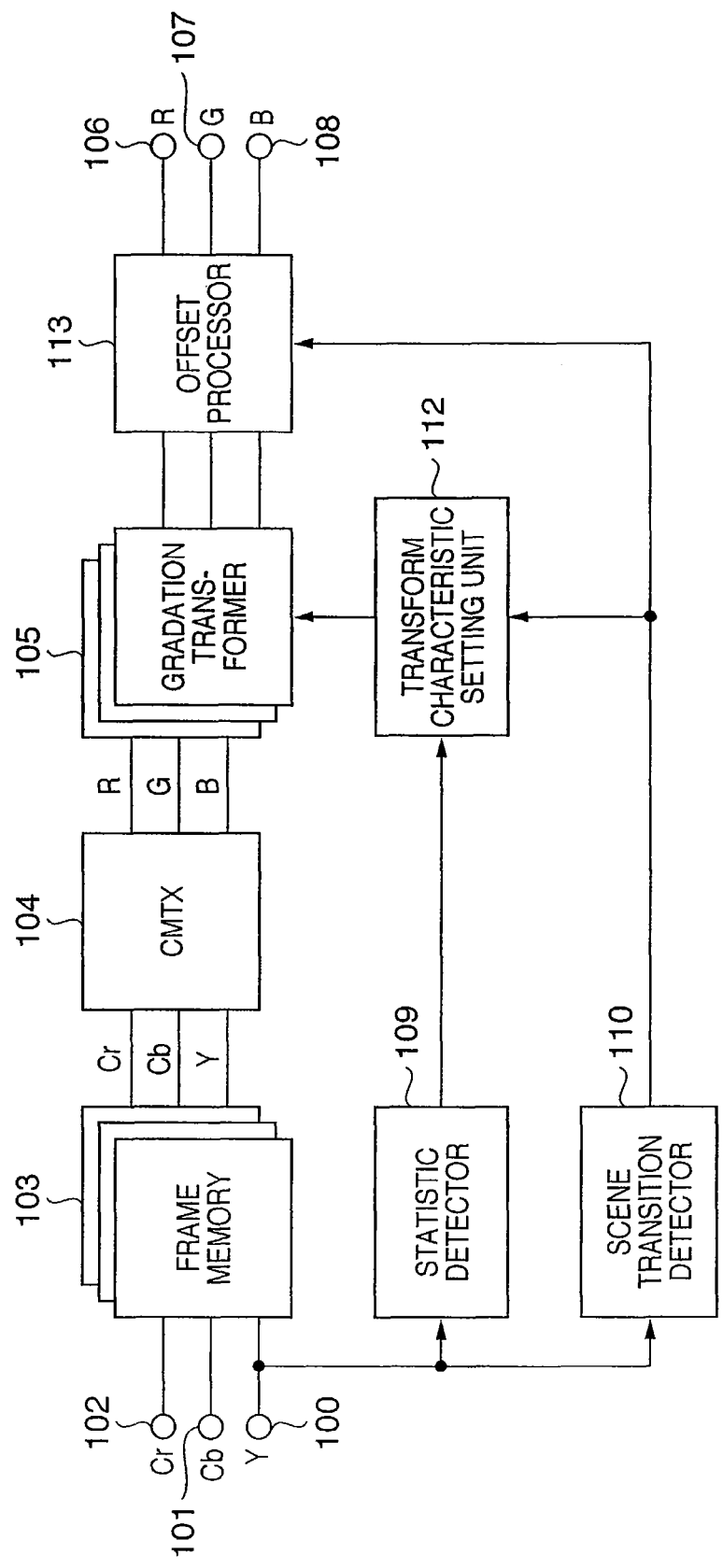
FIG. 17 is a block diagram showing the arrangement of an image processing apparatus according to the third embodiment.

FIG. 17 is a block diagram showing the arrangement of an image processing apparatus according to the third embodiment. This arrangement is different from that (FIG. 1) of the image processing apparatus of the first embodiment in the operation of a transform characteristic setting unit 112 and in that an offset processor 113 is connected between gradation transformers 105 and output terminals 106 to 108.

Figure 18:
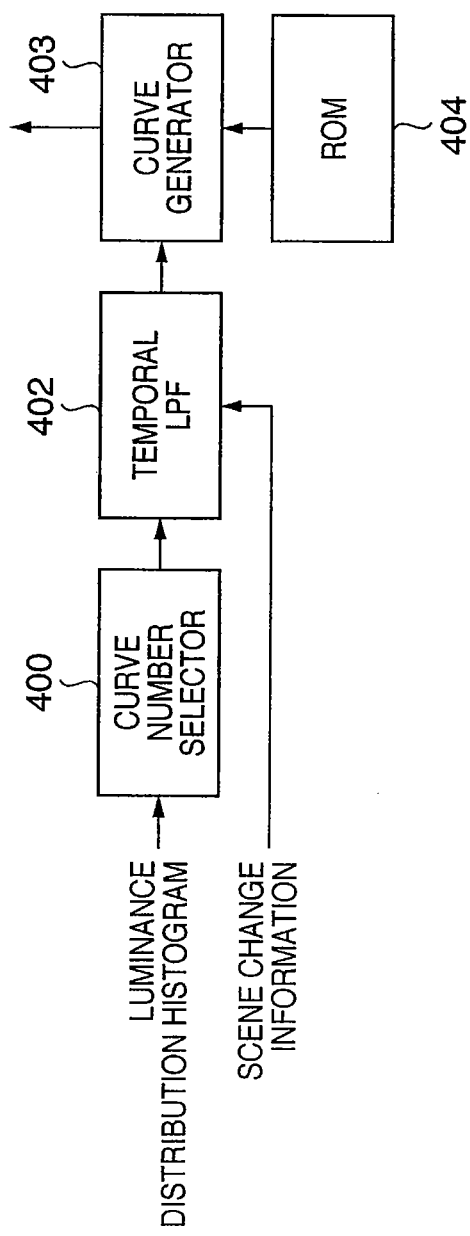
FIG. 18 is a block diagram showing the arrangement of a transform characteristic setting unit.

FIG. 18 is a block diagram showing the arrangement of the transform characteristic setting unit 112. Unlike the transform characteristic setting unit 111 (FIG. 3) of the first embodiment, the transform characteristic setting unit 112 includes no curve number corrector 401 for executing scene correction. Hence, the transform characteristic setting unit 112 sets, in the gradation transformers 105, a transform characteristic corresponding to a curve number selected by a curve number selector 400 and passed through a temporal LPF 402.

The offset processor 113 adds/subtracts an offset to/from R, G, and B video signals in accordance with scene change information, scene transitional direction information, and scene length information received from a scene transition detector 110.

Figure 19:
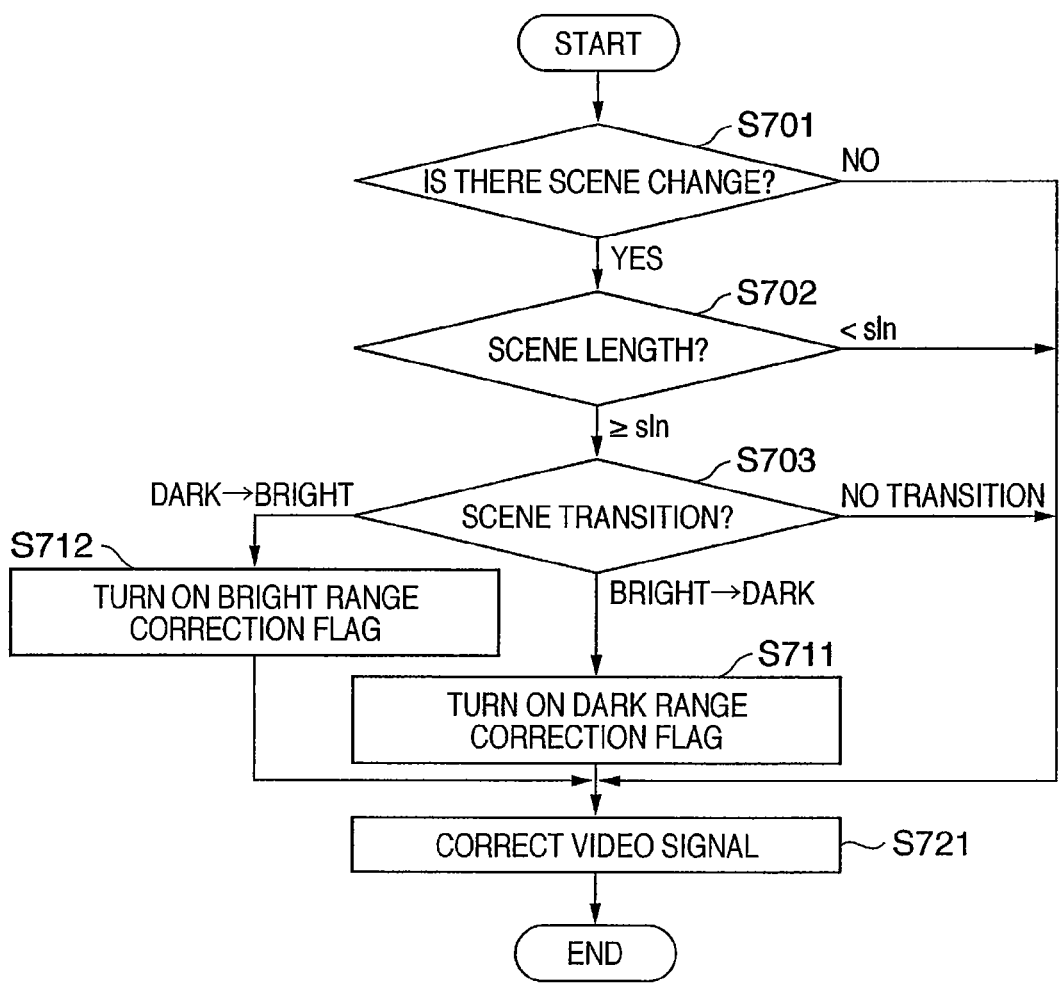
FIG. 19 is a flowchart for explaining scene correction by an offset processor.

FIG. 19 is a flowchart for explaining scene correction by the offset processor 113. The processes in steps S701 to S703 are the same as in the first embodiment (FIG. 7), and the processes in steps S711 and S712 are the same as in the second embodiment (FIG. 12). A detailed description of these processes will be omitted.

When the dark range correction flag is ON, the offset processor 113 adds a predetermined value OFFSETb1 to each of the R, G, and B video signals contained in one frame (dark range correction). When the bright range correction flag is ON, the offset processor 113 subtracts a predetermined value OFFSETw1 from each of the R, G, and B video signals (bright range correction). If both correction flags are OFF, no offset is added or subtracted (S721).

As described above, the image processing apparatus according to the third embodiment can generate a video signal complying with the adaptability of eyes by executing scene correction (offset addition/subtraction) for a video signal after gradation transform.

Normally, a video display apparatus includes an offset adder to adjust the brightness. When the offset processor 113 of the third embodiment also serves as an offset adder, the circuit scale of the video display apparatus can be made small.

In the above-described embodiments, Y, Cb, and Cr video signals are converted into R, G, and B video signals and then subjected to gradation transform. However, the video signal form is not particularly limited. The present invention incorporates any other arrangement for executing scene correction for the gradation transform characteristic of a video signal.

In the above-described embodiments, the gradation transform characteristic is changed in a frame period. However, the gradation transform characteristic change period is not particularly limited. For example, the gradation transform characteristic may change in a shorter field period, or a longer period corresponding to several frames such as 2 to 8 frames.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-236755, filed Aug. 31, 2006, which is hereby incorporated by reference herein in its entirety.

What is claimed is:

1. An image processing apparatus comprising:
a statistic detector that detects a statistic of a luminance distribution of an input video signal;
a scene-transition detector that detects (i) a scene change of the input video signal to output scene-change information which indicates whether a scene change exists or not, detects (ii) a transitional direction of brightness of a scene of the input video signal, and detects (iii) a scene length of a scene of the input video signal;
a gradation transformer that transforms a gradation characteristic of the input video signal; and
a setting unit that sets a transform characteristic of the gradation transformer based on detection results of the statistic detector and the scene-transition detector,
wherein the scene-transition detector compares brightness of a preceding frame with brightness of a current frame to output transitional direction information which indicates a direction of a change in the brightness as the transitional direction,
wherein, if a scene change is detected and the transitional direction in the detected scene change indicates transition from a bright scene to a dark scene, and a scene length detected by the scene-transition detector is equal to or more than a predetermined scene length, the setting unit sets the transform characteristic to allocate gradation steps to a low luminance side more than the gradation steps which would have been allocated to the low luminance side when the transform characteristic is determined only from the detection results of the statistic detector based on the luminance distribution of the input video signal, and
wherein, if a scene change is detected and the transitional direction in the detected scene change indicates transition from a dark scene to a bright scene, and a scene length detected by the scene-transition detector is equal or more than the predetermined scene length, the setting unit sets the transform characteristic to allocate the gradation steps to a high luminance side more than the gradation steps allocated to the high luminance side when the transform characteristic is determined only from the detection results of the statistic detector based on the luminance distribution of the input video signal.

2. The apparatus according to claim 1, further comprising:
an averaging unit that averages transform characteristics set by the setting unit within a range of a predetermined period, and resets the averaging in response to detection of the scene change.

3. The apparatus according to claim 1, further comprising a signal corrector that corrects the video signal output from the gradation transformer based on detection results of the scene-transition detector.

4. The apparatus according to claim 3, wherein the signal corrector executes correction by adding an offset to the video signal if a scene change is detected and the transitional direction in the detected scene change indicates transition from a bright scene to a dark scene, and a scene length detected by the scene-transition detector is equal to or more than the predetermined scene length, and
wherein the signal corrector executes correction by subtracting an offset from the video signal if a scene change is detected and the transitional direction in the detected scene change indicates transition from a dark scene to a bright scene, and a scene length detected by the scene-transition detector is equal to or more than the predetermined scene length.

5. An image processing apparatus comprising:
a statistic detector that detects a statistic of a luminance distribution of an input video signal;
a scene-transition detector that detects (i) a scene change of the input video signal to output scene-change information which indicates whether a scene change exists or not, detects (ii) a transitional direction of brightness of a scene of the input video signal, and detects (iii) a scene length of a scene of the input video signal;
a gradation transformer that transforms a gradation characteristic of the input video signal; and
a setting unit that sets a transform characteristic of the gradation transformer based on detection results of the statistic detector and the scene-transition detector,
wherein the scene-transition detector compares brightness of a preceding frame with brightness of a current frame to output transitional direction information which indicates a direction of a change in the brightness as the transitional direction,
wherein the setting unit sets the transform characteristic by adding an offset to a transform characteristic determined by the setting unit based only on the detection results of the statistic detector detecting the statistic of the luminance distribution of the input video signal, if a scene change is detected and the transitional direction in the detected scene change indicates transition from a bright scene to a dark scene, and a scene length detected by the scene-transition detector is equal to or more than a predetermined scene length, and
wherein the setting unit sets the transform characteristic by subtracting an offset from the transform characteristic determined by the setting unit based only on the detection results of the statistic detector detecting the statistic of the luminance distribution of the input video signal, if a scene change is detected and the transitional direction in the detected scene change indicates transition from a dark scene to a bright scene, and a scene length detected by the scene-transition detector is equal to or more than a predetermined scene length.

6. The apparatus according to claim 5, further comprising:
an averaging unit that averages transform characteristics set by the setting unit within a range of a predetermined period, and resets the averaging in response to detection of the scene change.

7. An image processing method comprising the steps of:
detecting a statistic of a luminance distribution of an input video signal;
detecting a scene change of the input video signal to output scene-change information which indicates whether a scene change exists or not;
detecting a transitional direction of brightness of a scene of the input video signal;
detecting a scene length of a scene of the input video signal;
transforming a gradation characteristic of the input video signal; and setting a transform characteristic in the transforming step based on detection results in the first to third detecting steps, wherein, in the third detecting step, brightness of a preceding frame and brightness of a current frame are compared to output transitional direction information which indicates a direction of a change in the brightness as the transitional direction, wherein, if a scene change is detected and the transitional direction in the detected scene change indicates transition from a bright scene to a dark scene, and a scene length detected in the fourth detecting step is equal to or more than a predetermined scene length, in the setting step, the transform characteristic is set to allocate gradation steps to a low luminance side more than the gradation steps allocated to the low luminance side when the transform characteristic is determined only from the detection results of the detecting step detecting the luminance distribution of the input video signal, and wherein, if a scene change is detected and the transitional direction in the detected scene change indicates transition from a dark scene to a bright scene, and a scene length detected in the fourth detecting step is equal to or more than the predetermined scene length, in the setting step, the transform characteristic is set to allocate the gradation steps to a high luminance side more than the gradation steps allocated to the high luminance side when the transform characteristic is determined only from the detection results of the detecting step detecting the luminance distribution of the input video signal.

8. The image processing method according to claim 7, further comprising:
averaging transform characteristics in the setting step within a range of a predetermined period, and resetting the averaging in response to detection of the scene change.

9. The image processing method according to claim 7, further comprising correcting the video signal output from the transforming step based on detection results in the second to fourth detecting steps.

10. The image processing method according to claim 9, wherein the correcting step executes correction by adding an offset to the video signal if a scene change is detected and the transitional direction in the detected scene change indicates transition from a bright scene to a dark scene, and a scene length detected in the fourth detecting step is equal to or more than the predetermined scene length, and
wherein the correcting step executes correction by subtracting an offset from the video signal if a scene change is detected and the transitional direction in the detected scene change indicates transition from a dark scene to a bright scene, and a scene length detected in the fourth detecting step is equal to or more than the predetermined scene length.

11. An image processing method comprising:
detecting a statistic of a luminance distribution of an input video signal;
detecting a scene change of the input video signal to output scene-change information which indicates whether a scene change exists or not;
detecting a transitional direction of brightness of a scene of the input video signal;
detecting a scene length of a scene of the input video signal;
transforming a gradation characteristic of the input video signal; and
setting a transform characteristic in the transforming step based on detection results of the first to third detecting steps, wherein, in the third detecting step, brightness of a preceding frame and brightness of a current frame are compared to output transitional direction information which indicates a direction of a change in the brightness as the transitional direction, wherein, in the setting step, the transform characteristic is set by adding an offset to a transform characteristic determined by the setting step based only on the detection results of the first detecting step detecting the statistic of the luminance distribution of the input video signal, if a scene change is detected in the second detecting step and the transitional direction in the detected scene change detected in the third detecting step indicates transition from a bright scene to a dark scene, and a scene length detected in the fourth detecting step is equal to or more than a predetermined scene length, and wherein, in the setting step, the transform characteristic is set by subtracting an offset from the transform characteristic determined by the setting step based only on the detection results of the first detecting step detecting the statistic of the luminance distribution of the input video signal, if a scene change is detected in the second detecting step and the transitional direction in the detected scene change detected in the third detecting step indicates transition from a dark scene to a bright scene, and a scene length detected in the fourth detecting step is equal to or more than the predetermined scene length.

12. The image processing method according to claim 11, further comprising:
averaging transform characteristics set in the setting step within a range of a predetermined period, and resetting the averaging in response to detection of the scene change.

* * * * *